(12) United States Patent
Nerstad et al.

(10) Patent No.: US 6,620,070 B2
(45) Date of Patent: Sep. 16, 2003

(54) MULTI-SPEED TRANSMISSION

(75) Inventors: Karl Arden Nerstad, East Peoria, IL (US); William Lee Short, Jr., East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/925,530

(22) Filed: Aug. 10, 2001

(65) Prior Publication Data

US 2003/0032520 A1 Feb. 13, 2003

(51) Int. Cl.[7] .............................................. F16H 37/04
(52) U.S. Cl. ......................... 475/219; 475/207; 74/360
(58) Field of Search .......................... 74/331, 325, 359, 74/360; 475/207, 219

(56) References Cited

U.S. PATENT DOCUMENTS

| 4,341,127 A | * | 7/1982 | Stodt ............................ 74/333 |
| 4,570,503 A | * | 2/1986 | Theobald ..................... 74/360 |
| 4,594,908 A | * | 6/1986 | Akashi et al. ................ 74/359 |
| 4,614,133 A |   | 9/1986 | Nerstad et al. |
| 4,658,673 A |   | 4/1987 | Nerstad et al. |
| 4,660,425 A |   | 4/1987 | Nerstad et al. |
| 4,676,116 A |   | 6/1987 | Nerstad et al. |
| 4,846,009 A | * | 7/1989 | Paluska, Jr. .................. 74/331 |
| 4,974,473 A | * | 12/1990 | Hatakeyama ............... 74/730.1 |
| 5,025,674 A | * | 6/1991 | McAskill ..................... 74/360 |
| 5,031,473 A | * | 7/1991 | Yumoto et al. .............. 74/359 |
| 5,081,878 A | * | 1/1992 | Stasiuk ........................ 74/360 |
| 5,117,702 A |   | 6/1992 | Rodeghiero et al. |
| 5,885,182 A | * | 3/1999 | Forsyth ...................... 475/198 |

FOREIGN PATENT DOCUMENTS

DE          19956734 A1 * 6/2000 ............ F16J/3/087

* cited by examiner

*Primary Examiner*—Ankur Parekh
(74) *Attorney, Agent, or Firm*—Finnegan, Henderson, Farabow, Garrett & Dunner

(57) ABSTRACT

A vehicle transmission is provided that includes an input shaft, a countershaft, and an output shaft. A plurality of clutches and gears are operatively disposed on the input shaft, countershaft, and output shaft. At least one of the clutches disposed on the input shaft is identical to at least one of the clutches disposed on the countershaft and to at least one of the clutches disposed on the output shaft.

17 Claims, 9 Drawing Sheets

| GEAR | CLUTCHES ENGAGED | SPEED* (kph) | SPEED* (mph) | STEP PERCENT |
|---|---|---|---|---|
| 1 | 22,36 | 2.66 | 1.65 | - |
| 2 | 24,36 | 3.36 | 2.09 | 27.0 |
| 3 | 26,36 | 4.26 | 2.65 | 26.6 |
| 4 | 28,36 | 5.41 | 3.36 | 27.0 |
| 5 | 22,38 | 6.44 | 4.00 | 19.1 |
| 6 | 22,30 | 7.24 | 4.50 | 12.6 |
| 7 | 24,38 | 8.18 | 5.08 | 12.8 |
| 8 | 24,30 | 9.21 | 5.72 | 12.6 |
| 9 | 26,38 | 10.35 | 6.43 | 12.4 |
| 10 | 26,30 | 11.65 | 7.24 | 12.6 |
| 11 | 28,38 | 13.13 | 8.16 | 12.8 |
| 12 | 28,30 | 14.79 | 9.19 | 12.6 |
| 13 | 22,32 | 17.61 | 10.94 | 19.1 |
| 14 | 24,32 | 22.37 | 13.90 | 27.0 |
| 15 | 26,32 | 28.31 | 17.59 | 26.6 |
| 16 | 28,32 | 35.95 | 22.34 | 27.0 |
| R1 | 34,36 | 2.12 | 1.32 | - |
| R2 | 34,38 | 5.15 | 3.20 | 143.0 |
| R3 | 34,30 | 5.79 | 3.60 | 12.6 |
| R4 | 34,32 | 14.10 | 8.76 | 143.0 |

* SPEED AT 2100 rpm

*FIG. 3*

| GEAR | CLUTCHES ENGAGED | SPEED* (kph) | SPEED* (mph) | STEP PERCENT |
|---|---|---|---|---|
| 1 | 22,36 | 2.64 | 1.64 | - |
| 2 | 24,36 | 3.35 | 2.08 | 27.0 |
| 3 | 26,36 | 4.25 | 2.64 | 26.6 |
| 4 | 28,36 | 5.39 | 3.35 | 27.0 |
| 5 | 22,38 | 6.42 | 3.99 | 19.1 |
| 6 | 22,30 | 7.23 | 4.49 | 12.6 |
| 7 | 24,38 | 8.14 | 5.06 | 12.8 |
| 8 | 24,30 | 9.17 | 5.70 | 12.6 |
| 9 | 26,38 | 10.32 | 6.41 | 12.4 |
| 10 | 26,30 | 11.60 | 7.21 | 12.6 |
| 11 | 28,38 | 13.10 | 8.14 | 12.8 |
| 12 | 28,30 | 14.74 | 9.16 | 12.6 |
| 13 | 22,32 | 17.56 | 10.91 | 19.1 |
| 14 | 24,32 | 22.29 | 13.85 | 27.0 |
| 15 | 26,32 | 28.21 | 17.53 | 26.6 |
| 16 | 28,32 | 35.82 | 22.26 | 27.0 |
| R1 | 70,36 | 2.32 | 1.44 | - |
| R2 | 34,36 | 3.40 | 2.11 | 47.0 |
| R3 | 70,38 | 5.63 | 3.50 | 66.0 |
| R4 | 70,30 | 6.34 | 3.94 | 12.6 |
| R5 | 34,38 | 8.26 | 5.13 | 30.3 |
| R6 | 34,30 | 9.29 | 5.77 | 12.6 |
| R7 | 70,32 | 15.39 | 9.56 | 66.0 |
| R8 | 34,32 | 22.58 | 14.03 | 47.0 |

* SPEED AT 2100 rpm

FIG. 5

| GEAR | CLUTCHES ENGAGED | SPEED* (kph) | SPEED* (mph) | STEP PERCENT |
|---|---|---|---|---|
| 1 | 22,36,34 | 2.67 | 1.66 | - |
| 2 | 24,36,34 | 3.40 | 2.11 | 27.0 |
| 3 | 26,36,34 | 4.28 | 2.66 | 26.6 |
| 4 | 28,36,34 | 5.44 | 3.38 | 27.0 |
| 5 | 22,38,34 | 6.49 | 4.03 | 19.1 |
| 6 | 22,30,34 | 7.31 | 4.54 | 12.6 |
| 7 | 24,38,34 | 8.24 | 5.12 | 12.8 |
| 8 | 24,30,34 | 9.27 | 5.76 | 12.6 |
| 9 | 26,38,34 | 10.43 | 6.48 | 12.4 |
| 10 | 26,30,34 | 11.73 | 7.29 | 12.6 |
| 11 | 28,38,34 | 13.23 | 8.22 | 12.8 |
| 12 | 28,30,34 | 14.90 | 9.26 | 12.6 |
| 13 | 22,32,34 | 17.73 | 11.02 | 19.1 |
| 14 | 24,32,34 | 22.53 | 14.00 | 27.0 |
| 15 | 26,32,34 | 28.52 | 17.72 | 26.6 |
| 16 | 28,32,34 | 36.21 | 22.50 | 27.0 |
| R1 | 22,36,70 | 2.67 | 1.66 | - |
| R2 | 24,36,70 | 3.40 | 2.11 | 27.0 |
| R3 | 26,36,70 | 4.28 | 2.66 | 26.0 |
| R4 | 28,36,70 | 5.44 | 3.38 | 27.0 |
| R5 | 22,38,70 | 6.49 | 4.03 | 19.1 |
| R6 | 22,30,70 | 7.31 | 4.54 | 12.6 |
| R7 | 24,38,70 | 8.24 | 5.12 | 12.8 |
| R8 | 24,30,70 | 9.27 | 5.76 | 12.6 |
| R9 | 26,38,70 | 10.43 | 6.48 | 12.4 |
| R10 | 26,30,70 | 11.73 | 7.29 | 12.6 |
| R11 | 28,38,70 | 13.23 | 8.22 | 12.8 |
| R12 | 28,30,70 | 14.90 | 9.26 | 12.6 |
| R13 | 22,32,70 | 17.73 | 11.02 | 19.1 |
| R14 | 24,32,70 | 22.53 | 14.00 | 27.0 |
| R15 | 26,32,70 | 28.52 | 17.72 | 26.6 |
| R16 | 28,32,70 | 36.21 | 22.50 | 27.0 |

* SPEED AT 2100 rpm

FIG. 7

| GEAR | CLUTCHES ENGAGED | SPEED* (kph) | SPEED* (mph) | STEP PERCENT |
|---|---|---|---|---|
| 1 | 22,36 | 2.64 | 1.64 | - |
| 2 | 24,36 | 3.35 | 2.08 | 27.0 |
| 3 | 26,36 | 4.25 | 2.64 | 26.6 |
| 4 | 28,36 | 5.39 | 3.35 | 27.0 |
| 5 | 22,30 | 7.23 | 4.49 | 34.1 |
| 6 | 24,30 | 9.17 | 5.70 | 27.0 |
| 7 | 26,30 | 11.60 | 7.21 | 26.6 |
| 8 | 28,30 | 14.74 | 9.16 | 27.0 |
| 9 | 22,32 | 17.56 | 10.91 | 19.1 |
| 10 | 24,32 | 22.29 | 13.85 | 27.0 |
| 11 | 26,32 | 28.21 | 17.53 | 26.6 |
| 12 | 28,32 | 35.82 | 22.26 | 27.0 |
| R1 | 70,36 | 2.11 | 1.31 | - |
| R2 | 34,36 | 3.40 | 2.11 | 61.0 |
| R3 | 70,30 | 5.78 | 3.59 | 70.2 |
| R4 | 34,30 | 9.29 | 5.77 | 60.7 |
| R5 | 70,32 | 14.05 | 8.73 | 51.0 |
| R6 | 34,32 | 22.58 | 14.03 | 61.0 |

* SPEED AT 2100 rpm

FIG. 9

MULTI-SPEED TRANSMISSION

TECHNICAL FIELD

The present application is directed to a transmission and, more particularly, to a multi-speed transmission for an off-highway vehicle.

BACKGROUND

Off-highway vehicles, such as, for example, wheel loaders, belted tractors, and other types of heavy machinery, are used to perform many earth-moving tasks. To effectively perform these tasks, the off-highway vehicles require a drive train that provides significant power, as well as a range of gearing that allows the vehicle to move at several different speeds. Typically, the off-highway vehicles include a multi-speed transmission that provides the necessary gearing.

An off-highway vehicle typically requires a multi-speed transmission that provides a maneuvering speed range, a working speed range, and a traveling speed range. The maneuvering speed range is generally a series of gears, or speeds, that provide for the slowest velocities of the off-highway vehicle for use in maneuvering around a job site. The working speed range is generally a series of gears, or speeds, that allow the off-highway vehicle to move at relatively slow velocities. The gears in the working speed range usually provide a relatively uniform increase in speed between gears. The traveling speed range is generally a series of gears, or speeds, that allow the off-highway vehicle to achieve a relatively high velocity, such as when traveling between job sites.

As described in U.S. Pat. No. 4,614,133, a multi-speed transmission for an off-highway vehicle typically includes a variety of gears and clutches that are disposed on a number of shafts. One of the shafts is an input shaft that is connected to an engine. Another of the shafts is an output shaft that is used to move the vehicle. The clutches are used to engage different combinations of gears that will connect the input shaft to the output shaft through a selected gear ratio. The selected gear ratio translates the rotational speed of the input shaft as provided by the engine into a desired rotational speed of the output shaft.

To generate the wide range of gear ratios required by the off-road vehicle, the multi-speed transmission typically includes a plurality of intermeshing gears and a corresponding plurality of clutches. Each of the gears may have different numbers of teeth to achieve the required gear ratios. In addition, differently designed clutches may be required to engage the different gears into the necessary gear ratios.

The manner in which the gears are engaged to provide the different gear ratios impacts the efficiency of the transmission. The efficiency of the transmission for a particular gear depends, in part, on the number of loaded gear meshes required to achieve the necessary gear ratio. Energy and efficiency are lost when the transmission requires multiple loaded gear meshes to achieve the necessary gear ratio. This drop in transmission efficiency results in a drop in the overall efficiency of the off-highway vehicle.

The number of different parts in the multi-speed transmission affects the cost of manufacturing, assembling, and repairing the multi-speed transmissions. Modifying tooling to manufacture different parts can become expensive. In addition, maintaining an adequate supply of the different parts for assembly or repair can also be costly.

The vehicle transmission of the present invention solves one or more of the problems set forth above.

SUMMARY OF THE INVENTION

One aspect of the present invention is directed to a vehicle transmission that includes an input shaft, a countershaft, and an output shaft. A plurality of clutches and gears are operatively disposed on the input shaft, countershaft, and output shaft. At least one of the clutches disposed on the input shaft is identical to at least one of the clutches disposed on the countershaft and to at least one of the clutches disposed on the output shaft.

In another aspect, the present invention is directed to a vehicle transmission that includes an input shaft, a countershaft, and an output shaft. A plurality of clutches and gears are operatively disposed on the input shaft, countershaft, and output shaft. One of the gears disposed on the input shaft is identical to one of the gears disposed on the countershaft. A second one of the gears disposed on the input shaft is identical to a second one of the gears disposed on the countershaft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings:

FIG. 3 is a chart identifying the engaged clutches, speeds, and step percents for each gear provided by the vehicle transmission of FIGS. 1 and 2;

FIG. 5 is a chart identifying the engaged clutches, speeds, and step percents for each gear provided by the vehicle transmission of FIG. 4;

FIG. 7 is a chart identifying the engaged clutches, speeds, and step percents for each gear provided by the vehicle transmission of FIG. 6;

FIG. 9 is a chart identifying the engaged clutches, speeds, and step percents for each gear provided by the vehicle transmission of FIG. 8.

DETAILED DESCRIPTION

Reference will now be made in detail to embodiments of the invention, examples of which are illustrated in the accompanying drawings.

Wherever possible, the same reference numbers will be used throughout the drawings to refer to the same or like parts.

Figure 1:
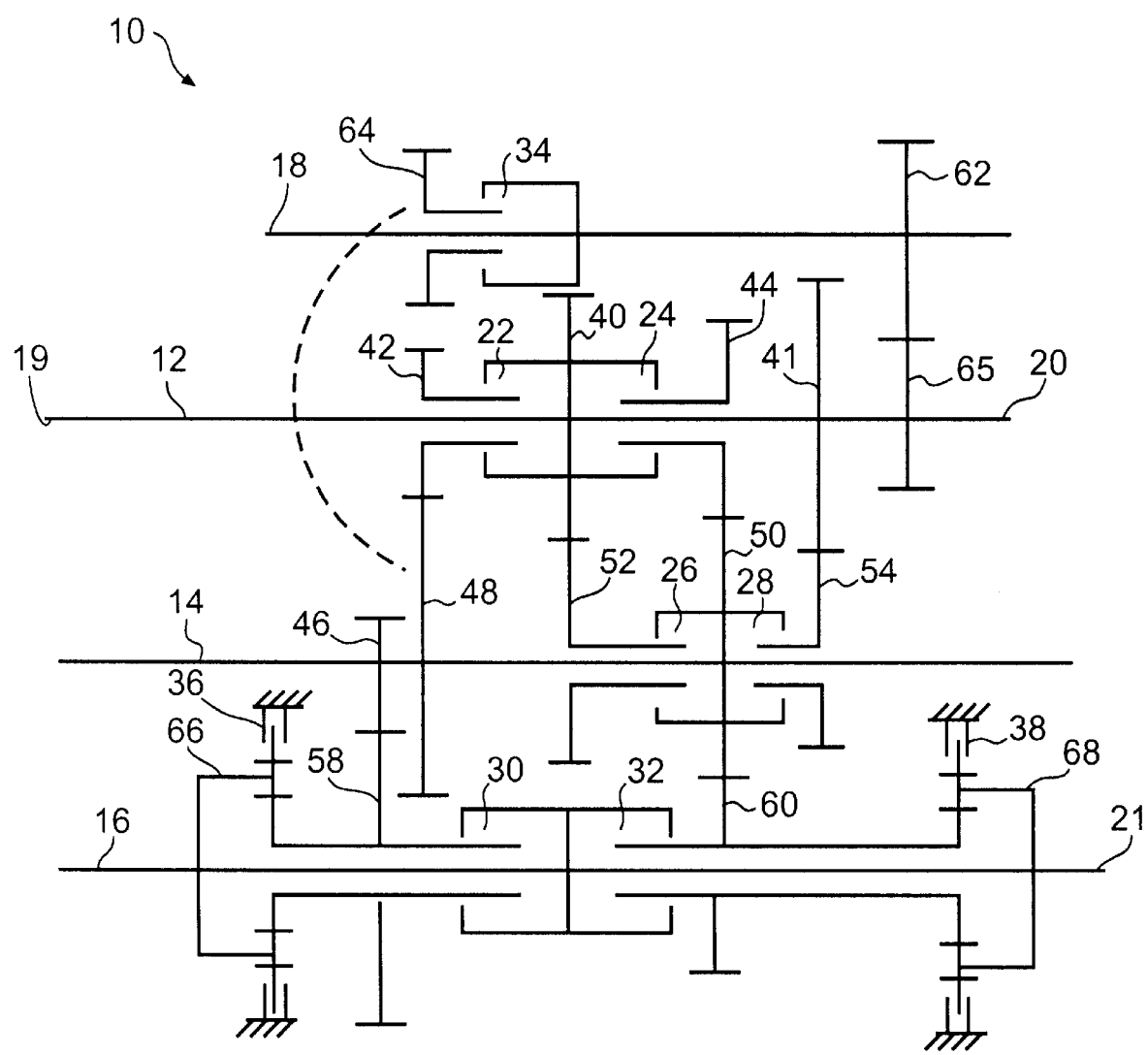
FIG. 1 is a schematic and diagrammatic illustration of a vehicle transmission in accordance with one embodiment of the present invention.
Figure 2:
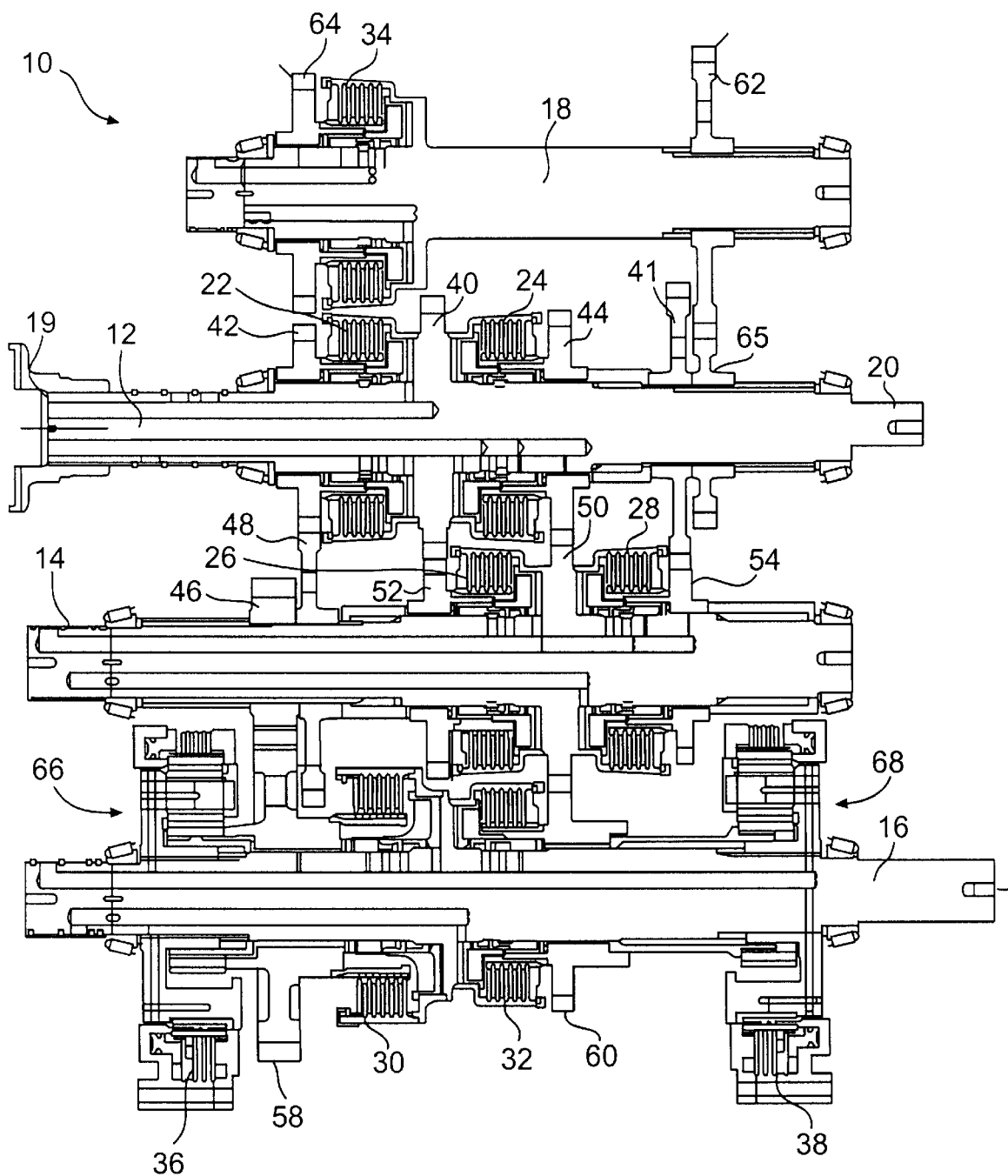
FIG. 2 is a diagrammatic cross-sectional view of the vehicle transmission of FIG. 1.

An exemplary embodiment of a vehicle transmission 10 is illustrated in FIGS. 1 and 2. As shown, vehicle transmission 10 includes an input shaft 12, a countershaft 14, and an output shaft 16. A first end 19 of input shaft 12 is connected to an engine (not shown). The engine applies a torque to input shaft 12, thereby causing input shaft 12 to rotate. A drive end 21 of output shaft 16 is connected to the drive train (not shown) of the vehicle.

A second end 20 of input shaft 12 may be used as a power take off ("PTO"). The PTO may be used to drive auxiliary equipment, such as, for example, a hydraulic pump, on the vehicle. Because the PTO comes from second end 20 of input shaft 12, the rotational speed of the PTO may be the same as the rotational speed provided by the engine. Accordingly, the PTO rotation speed may be independent of the transmission gearing.

As shown in FIGS. 1 and 2, a first gear 40 and a second gear 41 are fixably secured to input shaft 12. A third gear 42 and a fourth gear 44 are rotatably disposed on input shaft 12. A fifth gear 46, sixth gear 48, and seventh gear 50 are fixably secured to countershaft 14. An eighth gear 52 and a ninth gear 54 are rotatably mounted on countershaft 14.

A first rotating clutch 22 and a second rotating clutch 24 are disposed on input shaft 12. First rotating clutch 22 may be engaged to secure third gear 42 to input shaft 12. Similarly, second rotating clutch 24 may be engaged to secure fourth gear 44 to input shaft 12.

A third rotating clutch 26 and a fourth rotating clutch 28 are disposed on countershaft 14. Third rotating clutch 26 may be engaged to secure eighth gear 52 to countershaft 14. Similarly, fourth rotating clutch 28 may be engaged to secure ninth gear 54 to countershaft 14.

Each of first rotating clutch 22, second rotating clutch 24, third rotating clutch 26, and fourth rotating clutch 28 may be identical. For the purposes of the present disclosure, "identical" parts are parts that are constructed or manufactured within a particular manufacturing tolerance and may be interchanged without substantial modification. For example, identical clutches may utilize the same clutch cylinders, clutch hubs, clutch disks, clutch plates, clutch pistons, balance pistons, seals, end plates, retaining rings, and springs.

As shown in FIGS. 1 and 2, first gear 40, which is secured to input shaft 12, intermeshes with eighth gear 52, which is rotatably mounted on countershaft 14. Second gear 41, which is also secured to input shaft 12, intermeshes with ninth gear 54, which is rotatably mounted on countershaft 14. Third gear 42, which is rotatably mounted on input shaft 12, intermeshes with sixth gear 48, which is fixed to countershaft 14. Fourth gear 44, which is rotatably mounted on input shaft 12, intermeshes with seventh gear 50, which is fixed to countershaft 14.

If neither of the first, second, third, and fourth rotating clutches 22, 24, 26, and 28 are engaged, input shaft 12 is not linked to countershaft 14 and, thus, will rotate freely, without a corresponding rotation in countershaft 14. To generate a rotation in countershaft 14, one of the first, second, third, or fourth rotating clutches 22, 24, 26, and 28 may be engaged. When first rotating clutch 22 is engaged, third gear 42 is secured to input shaft 12. Because third gear 42 intermeshes with sixth gear 48, a rotation of input shaft 12 will result in a corresponding rotation of countershaft 14. The speed of the resulting rotation of countershaft 14 is dependent upon the gear ratio of third gear 42 and sixth gear 48.

When second rotating clutch 24 is engaged, fourth gear 44 is secured to input shaft 12. Because fourth gear 44 intermeshes with seventh gear 50, a rotation of input shaft 12 will result in a corresponding rotation of countershaft 14. The speed of the resulting rotation of countershaft 14 is dependent upon the gear ratio of fourth gear 44 and seventh gear 50.

When third rotating clutch 26 is engaged, eighth gear 52 is secured to countershaft 14. Because eighth gear 52 intermeshes with first gear 40, a rotation of input shaft 12 will result in a corresponding rotation of countershaft 14. The speed of the resulting rotation of countershaft 14 is dependent upon the gear ratio of first gear 40 and eighth gear 52.

When fourth rotating clutch 28 is engaged, ninth gear 54 is secured to countershaft 14. Because ninth gear 54 intermeshes with second gear 41, a rotation of input shaft 12 will result in a corresponding rotation of countershaft 14. The speed of the resulting rotation of countershaft 14 is dependent upon the gear ratio of second gear 41 and ninth gear 54.

As also illustrated in FIGS. 1 and 2, a tenth gear 58 and an eleventh gear 60 are rotatably mounted on output shaft 16. Tenth gear 58 intermeshes with sixth gear 46, which is fixed to countershaft 14. Eleventh gear 60 intermeshes with seventh gear 50, which is also fixed to countershaft 14.

A fifth rotating clutch 30 and a sixth rotating clutch 32 are also disposed on output shaft 16. Fifth rotating clutch 30 may be engaged to secure tenth gear 58 to output shaft 16. Similarly, sixth rotating clutch 60 may be engaged to secure eleventh gear 60 to output shaft 16. Sixth rotating clutch 32 may be identical to first, second, third, and fourth rotating clutches 22, 24, 26, and 28.

As shown in FIGS. 1 and 2, vehicle transmission 10 further includes a first planetary gear train 66 and a second planetary gear train 68. A first stationary clutch 36 may be engaged to connect first planetary gear train 66 with output shaft 16. A second stationary clutch 38 may be engaged to connect second planetary gear train 66 with output shaft 16. First planetary gear train 66 may be identical to second planetary gear train 68. In addition, first stationary clutch 36 may be identical to second stationary clutch 38.

The engagement of one of fifth rotating clutch 30, sixth rotating clutch 32, first stationary clutch 36, or second stationary clutch 38 links countershaft 14 to output shaft 16. Accordingly, a rotation of countershaft 14 will result in a corresponding rotation of output shaft 16, which may be used to drive the vehicle. The resulting rotational speed of output shaft 16 will depend on the gear ratios created by the engaged clutch.

As further illustrated in FIGS. 1 and 2, vehicle transmission 10 also may include a reverse shaft 18. A first reverse gear 62 is fixed to reverse shaft 18 and a second reverse gear 64 is rotatably mounted on reverse shaft 18. First reverse gear 62 intermeshes with a third reverse gear 65 that is secured to input shaft 12. Second reverse gear 64 intermeshes with sixth gear 48, which is fixed to countershaft 14.

A seventh rotating clutch 34 is also disposed on reverse shaft 18. Seventh rotating clutch 34 may be engaged to secure second reverse gear 64 to reverse shaft 18. As will be apparent, engagement of seventh rotating clutch 34 will result in a reverse rotation of countershaft 14 and, thus, a reverse rotation of output shaft 16.

The table of FIG. 3 summarizes the gears, or speeds, provided by vehicle transmission 10 in the embodiment illustrated in FIGS. 1 and 2. The table also sets forth the combination of clutches that may be engaged to achieve each gear, the speed of the vehicle in kph and mph when the engine is rotating at 2100 rpm, and the percentage increase in speed between gears. As shown, vehicle transmission 10 provides for 16 forward speeds and 4 reverse speeds. To obtain the gear ratios necessary to provide the speeds listed in FIG. 3, the following gear sizes may be used: first gear 40 of 45 teeth; second gear 41 of 50 teeth; third gear 42 of 35 teeth; fourth gear 44 of 40 teeth; fifth gear 46 of 25 teeth; sixth gear 48 of 50 teeth; seventh gear 50 of 45 teeth; eighth gear 52 of 40 teeth; ninth gear 54 of 35 teeth; tenth gear 58 of 54 teeth; eleventh gear 60 of 40 teeth; first reverse gear 62 of 50 teeth; second reverse gear 64 of 40 teeth; first planetary gear train 66 having a ring of 92 teeth, sun of 53 teeth, and planet of 20 teeth; and second planetary gear train 68 having a ring of 92 teeth, sun of 53 teeth, and planet of 20 teeth.

As will be noted, several of the gears in vehicle transmission 10 have the same number of teeth and may, therefore, be identical. Third gear 42 on input shaft 12 may be identical to ninth gear 54 on countershaft 14. Also, fourth gear 44 on input shaft 12 may be identical to eighth gear 52 on countershaft 14 and to second reverse gear 64 on reverse shaft 18. In addition, second gear 41 on input shaft 12 may be identical to sixth gear 48 on countershaft 14 and to first reverse gear 62 on reverse shaft 18. Also, stationary clutch 36 may be identical to stationary clutch 38 and first planetary gear train 66 may be identical to second planetary gear train 68.

Figure 4:
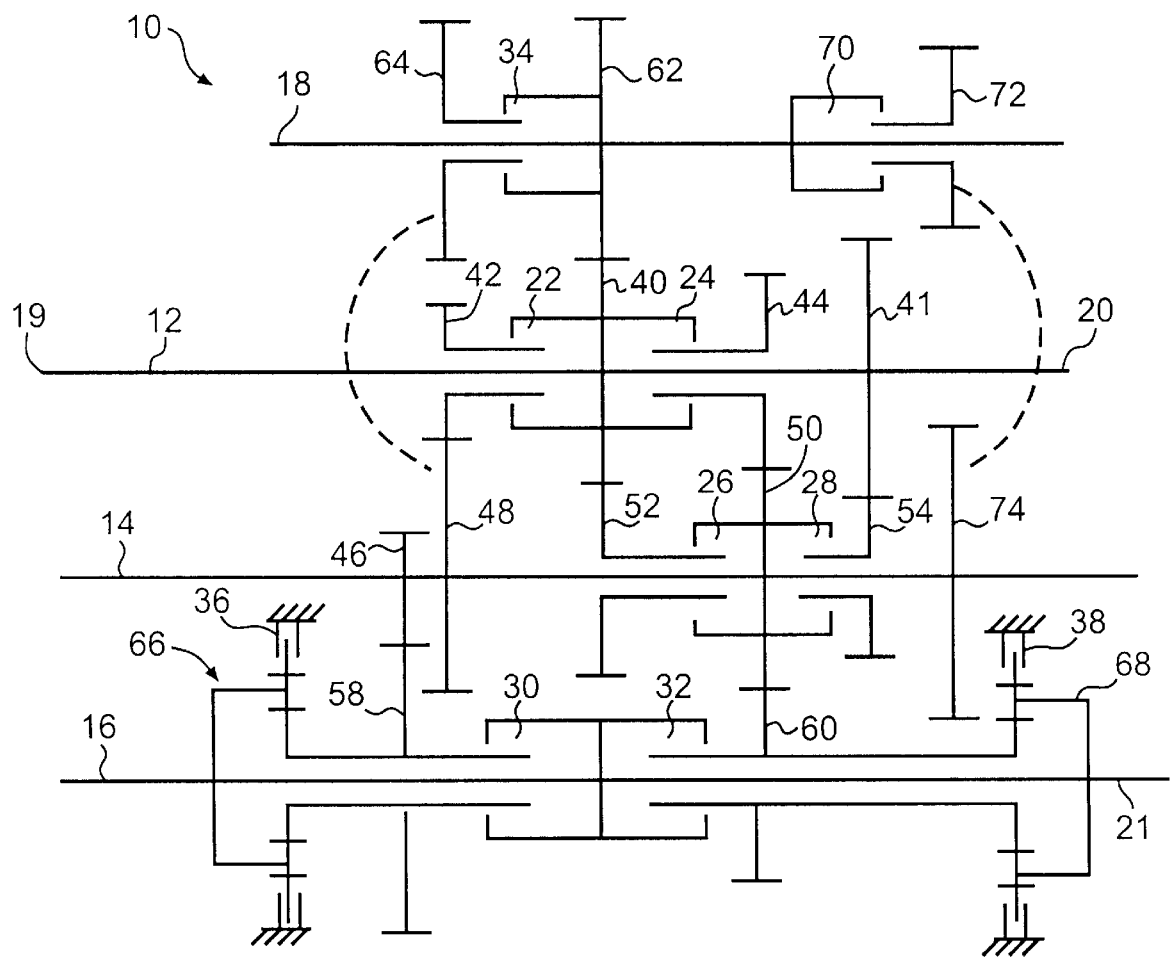
FIG. 4 is a schematic and diagrammatic illustration of a vehicle transmission in accordance with another embodiment of the present invention.

Another embodiment of vehicle transmission 10 is illustrated in FIG. 4. The embodiment of FIG. 4 is similar to the embodiment of FIGS. 1 and 2 and provides the identical 16 forward speeds. The embodiment of FIG. 4, however, provides an additional four reverse speeds.

The additional reverse speeds are achieved with an eighth rotating clutch 70 that is disposed on reverse shaft 18 and a fourth reverse gear 72 that is rotatably disposed on reverse shaft 18. Eighth rotating clutch may be engaged to secure fourth reverse gear 72 to reverse shaft 18.

As shown in FIG. 4, first reverse gear 62 intermeshes with first gear 40 on input shaft 12 and. Fourth reverse gear 72 intermeshes with a fifth reverse gear 74 that is secured to countershaft 14. In this embodiment, either one of the seventh rotating clutch 34 or eighth rotating clutch 70 may be engaged to achieve a reverse rotation of output shaft 16.

The table of FIG. 5 summarizes the gears, or speeds, provided by vehicle transmission 10 as illustrated in FIG. 4. The table also sets forth the combination of clutches that may be engaged to achieve each gear, the speed of the vehicle in kph and mph when the engine is rotating at 2100 rpm, and the percentage increase in speed between gears. As shown, this embodiment of vehicle transmission 10 provides for 16 forward speeds and 8 reverse speeds. To obtain the gear ratios necessary to provide the speeds listed in FIG. 5, the following gear sizes may be used: first reverse gear 62 of 55 teeth, second reverse gear 64 of 55 teeth; fourth reverse gear 72 of 45 teeth; and fifth reverse gear 74 of 60 teeth.

Figure 6:
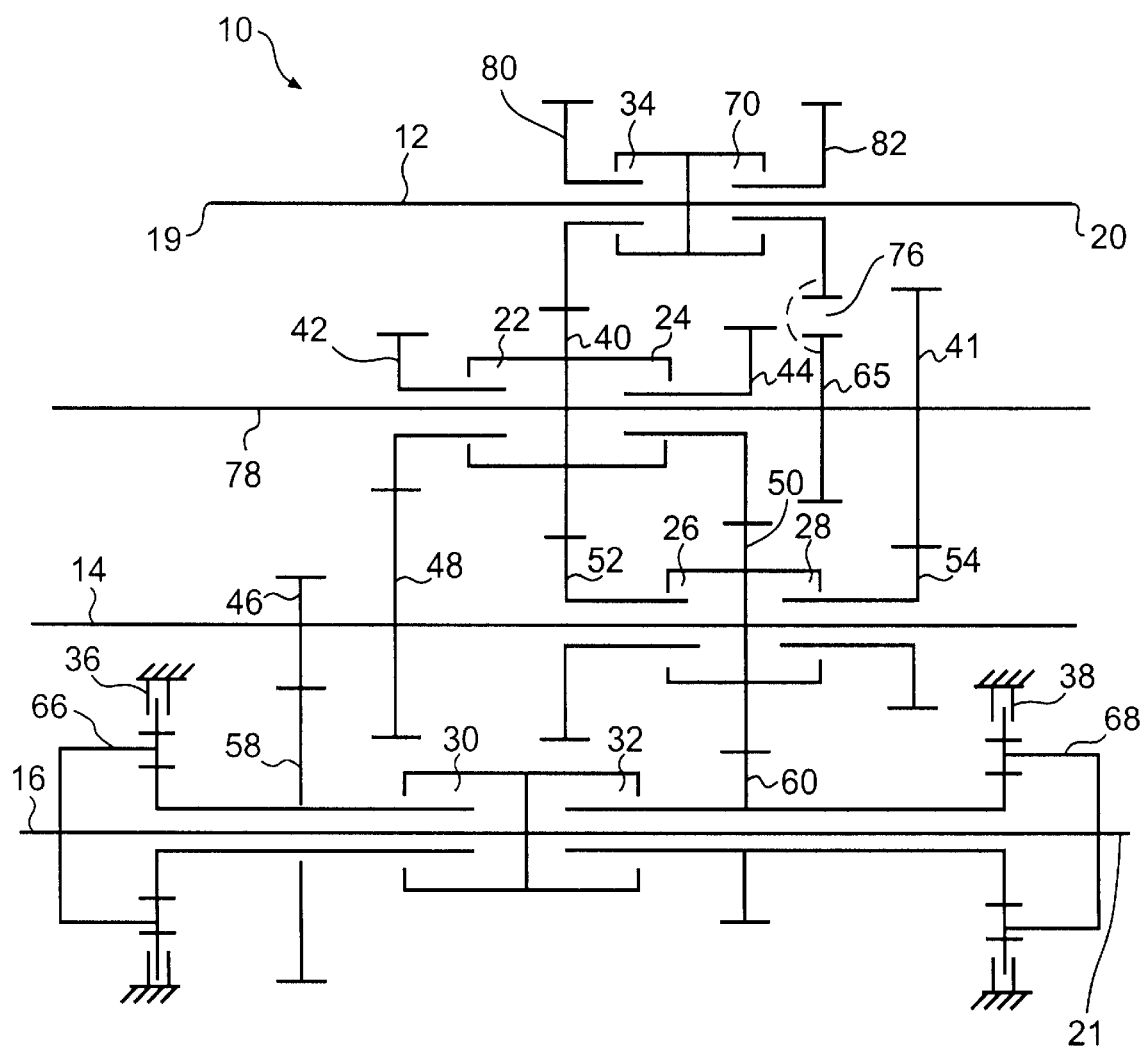
FIG. 6 is a schematic and diagrammatic illustration of a vehicle transmission in accordance with yet another embodiment of the present invention.

Another embodiment of vehicle transmission 10 is illustrated in FIG. 6. The embodiment of FIG. 6 is similar to the embodiments illustrated in FIGS. 1, 2, and 4 in that the same 16 forward speeds are provided. The embodiment of FIG. 6, however, provides for 16 reverse speeds.

The 16 reverse speeds are achieved with a second countershaft 78, a forward gear 80, a reverse gear 82, and an idler gear 76. As shown in FIG. 6, First gear 40, second gear 41, third gear 42, fourth gear 44, and third reverse gear 65 are disposed on second countershaft 78. Input shaft 12 rotatably mounts forward gear 80 that intermeshes with first gear 40 and reverse gear 82. Input shaft 12 further mounts seventh rotating clutch 34 and eighth rotating clutch 70. Idler gear 76 is positioned between reverse gear 82 and third reverse gear 65.

To achieve forward speeds, seventh rotating clutch 34 is engaged to secure forward gear 80 to input shaft 12. Because forward gear 80 intermeshes with first gear 40, a rotation of input shaft 12 results in a corresponding rotation of second countershaft 78. The resulting rotational speed of second countershaft 78 will depend on the gear ratio between forward gear 80 and first gear 40. The other clutches may be engaged as described in connection with FIGS. 1 and 2 to achieve 16 forward speeds.

To achieve reverse speeds, eighth rotating clutch 70 is engaged to secure reverse gear 82 to input shaft 12. Because idler gear 76 is disposed between reverse gear 82 and third reverse gear 65, a rotation of input shaft 12 results in a reverse rotation of second countershaft 78. The resulting reverse rotational speed of second countershaft 78 will depend on the gear ratio between reverse gear 82, idler gear 76, and third reverse gear 65. The other clutches may be engaged as described in connection with FIGS. 1 and 2 to achieve 16 reverse speeds.

The table of FIG. 7 summarizes the gears, or speeds, provided by vehicle transmission 10 as illustrated in FIG. 6. The table also sets forth the combination of clutches that may be engaged to achieve each gear, the speed of the vehicle in kph and mph when the engine is rotating at 2100 rpm, and the percentage increase in speed between gears. As shown, this embodiment of vehicle transmission 10 provides for 16 forward speeds and 16 reverse speeds. To obtain the gear ratios necessary to provide the speeds listed in FIG. 7, the following gear sizes may be used: forward gear 80 of 45 teeth; reverse gear 82 of 35 teeth; and third reverse gear 65 of 35 teeth. As will be noted, reverse gear 82 may be identical to third gear 42 and ninth gear 54.

Figure 8:
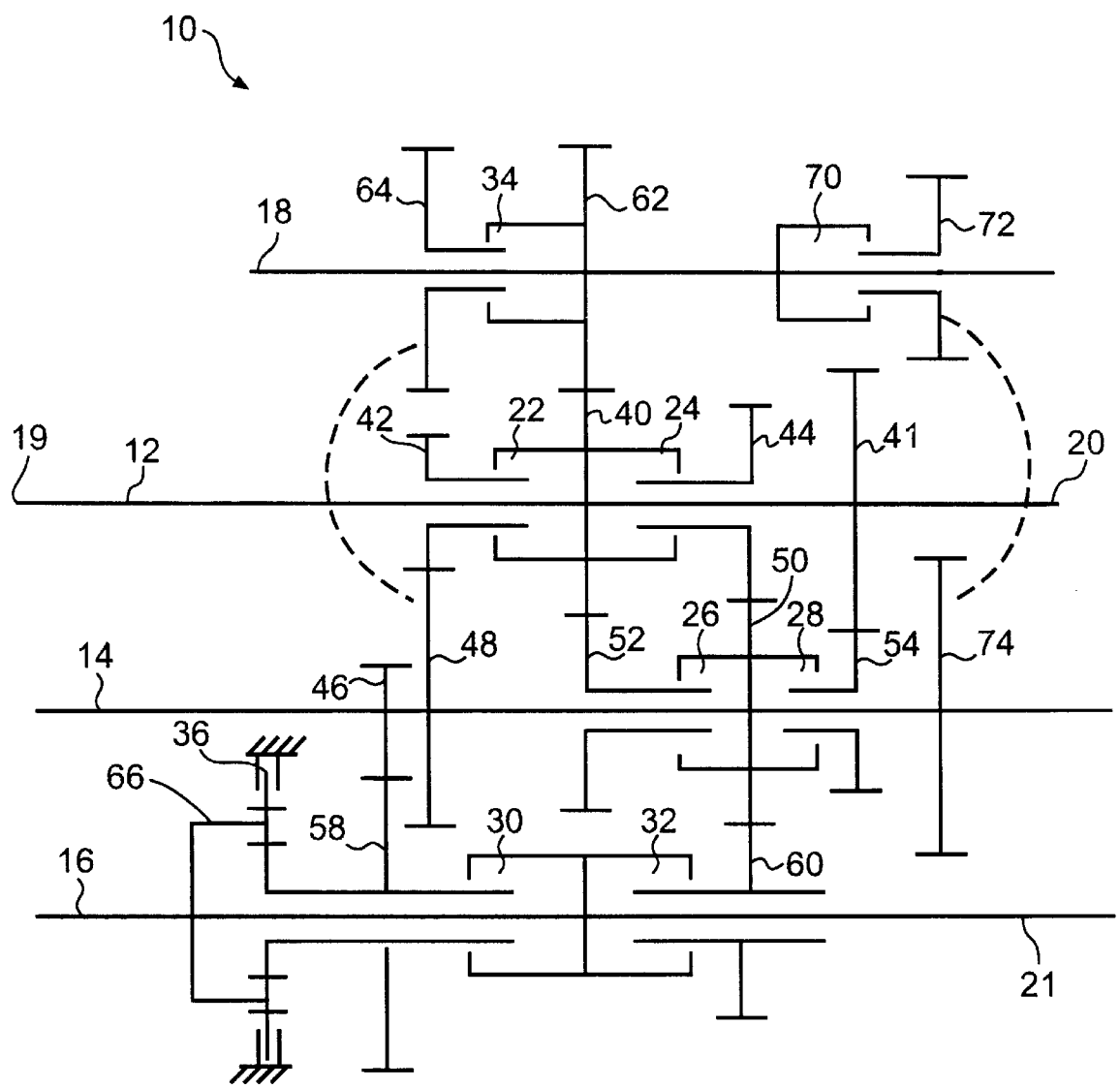
FIG. 8 is a schematic and diagrammatic illustration of a vehicle transmission in accordance with still another embodiment of the present invention.

The embodiment of vehicle transmission 10 illustrated in FIG. 8 is similar to the embodiment illustrated in FIG. 4, with the exception that second planetary gear train 68 and second stationary clutch 38 are removed. As shown in the table of FIG. 9, removing second planetary gear train 68 reduces the number of speeds provided by vehicle transmission 10. As shown in FIG. 9, this embodiment of vehicle transmission 10 provides for 12 forward speeds and 6 reverse speeds.

Industrial Applicability

While the present invention has potential application in any vehicle having a multi-speed transmission, the invention has particular applicability in off-highway vehicles. Such vehicles include, by way of example, wheel loaders, motor graders, and tractors. Such off-highway vehicles have specific gearing requirements that the present invention is capable of meeting. By means of example, an agricultural tractor may require four forward speeds for maneuvering, eight forward speeds for tillage, and four forward speeds for high speed travel. The present invention can provide relatively uniform and closely spaced speeds in, inter alia, the tillage range that enhance tractor performance and shift quality.

The present invention provides a multi-speed transmission for an off-highway vehicle that utilizes a number of common parts. In particular, the described transmission utilizes several identical clutches and several identical gears. The utilization of common parts reduces the costs associated with assembling, manufacturing, and repairing the transmission as the number of different parts for the transmission is reduced.

The present invention also provides a multi-speed transmission that has a minimum number of loaded gear meshes in each of the various speeds. This will improve the efficiency of the transmission. The efficiency of the transmission is passed along to the vehicle, thereby making the entire vehicle more efficient.

In addition, there are multiple common parts between embodiments of the present invention. As noted previously, each embodiment may share identical clutches and gears. Therefore, the transmission of the present invention is easily adaptable to provide a larger or smaller number of speeds, depending upon the requirements of the off-highway vehicle. With the addition of an identical planetary gear train, the number of forward and reverse speeds may be increased. Further, the addition of a second countershaft allows the transmission of the present invention to provide 16 forward speeds and 16 reverse speeds.

The present invention also provides a transmission that has only two rotating clutches per shaft. This enhances the lube oil and clutch pressure oil distribution. In addition, the design of each of the input shaft, countershaft, and output shaft is simplified and, thus, each shaft is easier to manufacture.

It will be apparent to those skilled in the art that various modifications and variations can be made in the multi-speed transmission of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A vehicle transmission, comprising:
   an input shaft,
   a countershaft,
   an output shaft;
   a plurality of clutches and gears operatively disposed on the input shaft, countershaft, and output shaft, wherein at least one of the clutches disposed on the input shaft is identical to at least one of the clutches disposed on the countershaft and to at least one of the clutches disposed on the output shaft; and
   two identical planetary gear trains and two identical stationary clutches, each of the stationary clutches configured to selectively engage one of the planetary gear trains to the output shaft.

2. A vehicle transmission, comprising:
   an input shaft,
   a countershaft,
   an output shaft;
   a plurality of clutches and gears operatively disposed on the input shaft, countershaft, and output shaft, wherein at least one of the clutches disposed on the input shaft is identical to at least one of the clutches disposed on the countershaft and to at least one of the clutches disposed on the output shaft; and
   a reverse shaft having a set of gears and a clutch configured to provide at least 4 reverse speeds.

3. The transmission of claim 2, wherein the clutch on the reverse shaft is identical to said at least one clutch disposed on the input shaft.

4. The transmission of claim 1, wherein two rotating clutches are disposed on the input shaft and two rotating clutches are disposed on the countershaft and each of the rotating clutches on the input shaft and countershaft are identical.

5. The transmission of claim 2, wherein one of the gears disposed on the input shaft is identical to one of the gears disposed on the countershaft and to one of the gears disposed on the reverse shaft.

6. The transmission of claim 5, wherein a second one of the gears disposed on the input shaft is identical to a second one of the gears disposed on the countershaft.

7. The transmission of claim 6, wherein a second gear on the reverse shaft is identical to a third one of the gears disposed on the input shaft and a third one of the gears disposed on the countershaft.

8. A vehicle transmission, comprising:
   an input shaft;
   a countershaft;
   an output shaft; and
   a plurality of clutches and gears operatively disposed on the input shaft, countershaft, and output shaft, wherein one of the gears disposed on the input shaft is identical to one of the gears disposed on the countershaft, and wherein a second one of the gears disposed on the input shaft is identical to a second one of the gears disposed on the countershaft;
   wherein one of the clutches disposed on the input shaft is identical to one of the clutches disposed on the countershaft and to one of the clutches disposed on the output shaft.

9. A vehicle transmission, comprising:
   an input shaft;
   a countershaft;
   an output shaft;
   a plurality of clutches and gears operatively disposed on the input shaft, countershaft, and output shaft, wherein one of the gears disposed on the input shaft is identical to one of the gears disposed on the countershaft, and wherein a second one of the gears disposed on the input shaft is identical to a second one of the gears disposed on the countershaft; and
   two identical planetary gear trains and two identical stationary clutches, each of the stationary clutches configured to selectively secure one of the planetary gear trains to the output shaft.

10. A vehicle transmission comprising:
    an input shaft;
    a countershaft;
    an output shaft;
    a plurality of clutches and gears operatively disposed on the input shaft, countershaft, and output shaft, wherein one of the gears disposed on the input shaft is identical to one of the gears disposed on the countershaft, and wherein a second one of the gears disposed on the input shaft is identical to a second one of the gears disposed on the countershaft; and
    a reverse shaft having a set of gears and a clutch configured to provide at least 4 reverse speeds.

11. The transmission of claim 10, wherein the clutch on the reverse shaft is identical to said at least one clutch disposed on the input shaft.

12. The transmission of claim 10, wherein a first gear on the reverse is identical to said second one of the gears disposed on the input shaft and a second gear on the reverse shaft is identical to a third one of the gears disposed on the input shaft and a third one of the gears disposed on the countershaft.

13. The transmission of claim 8, wherein two rotating clutches are disposed on the input shaft and two rotating clutches are disposed on the countershaft and each of the two rotating clutches on the input shaft and countershaft are identical.

14. A vehicle transmission, comprising:
an input shaft having a first and a second gear fixed thereto and a third and a fourth gear rotatably disposed thereon;
a countershaft having a fifth gear fixed thereon, a sixth gear fixed thereon and intermeshing with the third gear, a seventh gear fixed thereon and intermeshing with the fourth gear, an eighth gear rotatably disposed thereon and intermeshing with the first gear, and a ninth gear rotatably disposed thereon and intermeshing with the second gear;
an output shaft having a tenth gear rotatably disposed thereon and intermeshing with the fifth gear and an eleventh gear rotatably disposed thereon and intermeshing with the seventh gear;
a planetary gear train selectively securable to the output shaft; and
a plurality of clutches operatively disposed on the input shaft, the countershaft, and the output shaft to selectively engage said gears on the input shaft, the countershaft, and the output shaft to provide at least twelve forward speeds.

15. The vehicle transmission of claim 14, further including a second planetary gear train selectively securable to the output shaft.

16. The vehicle transmission of claim 14, further including a reverse shaft having a first reverse gear fixed thereto and a second reverse gear rotatably disposed thereon and a reverse clutch operatively disposed on the output shaft to selectively generate a reverse rotation of the output shaft and to provide at least four reverse speeds.

17. The vehicle transmission of claim 16, further including a third reverse gear fixed to the reverse shaft and a second reverse clutch operatively disposed on the reverse shaft to provide an additional four reverse speeds.

* * * * *

UNITED STATES PATENT AND TRADEMARK OFFICE
CERTIFICATE OF CORRECTION

PATENT NO.    : 6,620,070 B2
DATED         : September 16, 2003
INVENTOR(S)   : Karl Arden Nerstad et al.

It is certified that error appears in the above-identified patent and that said Letters Patent is hereby corrected as shown below:

Column 8,
Line 61, "reverse is" should read -- reverse shaft is -- .

Signed and Sealed this

Second Day of December, 2003

JAMES E. ROGAN
*Director of the United States Patent and Trademark Office*